(12) United States Patent
Paschke et al.

(10) Patent No.: US 9,041,347 B2
(45) Date of Patent: May 26, 2015

(54) MULTI-ORIENTATION STAND FOR A PORTABLE ELECTRONIC DEVICE

(75) Inventors: Brian Dennis Paschke, Toronto (CA); Todd Andrew Wood, Toronto (CA); Ippei Matsumoto, London (GB); Kimberlee Colin, London (GB); Samuel Hecht, London (GB); Philipp Von Lintel, London (GB)

(73) Assignee: BlackBerry Limited, Waterloo, Ontario (CA)

( * ) Notice: Subject to any disclaimer, the term of this patent is extended or adjusted under 35 U.S.C. 154(b) by 355 days.

(21) Appl. No.: 13/529,153

(22) Filed: Jun. 21, 2012

(65) Prior Publication Data
US 2013/0342159 A1 Dec. 26, 2013

(51) Int. Cl.
| | |
|---|---|
| *H02J 7/00* | (2006.01) |
| *F16M 11/00* | (2006.01) |
| *F16M 11/04* | (2006.01) |
| *F16M 13/00* | (2006.01) |
| *H02J 7/02* | (2006.01) |

(52) U.S. Cl.
CPC ............ *F16M 11/041* (2013.01); *F16M 13/00* (2013.01); *F16M 2200/08* (2013.01); *H02J 7/0042* (2013.01); *H02J 7/025* (2013.01)

(58) Field of Classification Search
USPC ................................................ 320/108, 115
See application file for complete search history.

(56) References Cited

U.S. PATENT DOCUMENTS

| | | | |
|---|---|---|---|
| 7,209,124 | B2 | 4/2007 | Hunt et al. |
| 7,916,467 | B2 | 3/2011 | Hotelling et al. |
| 2010/0146308 | A1 | 6/2010 | Gioscia et al. |
| 2011/0259788 | A1 | 10/2011 | Zeliff et al. |

OTHER PUBLICATIONS

Extended European search report mailed Oct. 10, 2012, in corresponding European patent application No. 12172894.3.
Launch Port: "LaunchPort BaseStation", Apr. 9, 2012, XP55039622, Retrieved from the internet: URL: http://www.launchport.com/files/download/46; retrieved on Oct. 1, 2012.
James Hannibal: "tech Review: the Scooter 1,2 iPhone Stand by Insanely Great Products", Feb. 11, 2012, XP55039707, retrieved from the internet: URL: http://www.examiner.com/review/tech-review-the-scooter-iphone-stand-by-insanely-great-products; retrieved on Oct. 1, 2012.
Ilovehandles: "Facet", Dec. 31, 2011, XP55039695, retrieved from the internet: URL: http://i lovehandles.net/products-page/ipad/facet/ ; retrieved on Oct. 1, 2012.

(Continued)

*Primary Examiner* — Sun Lin
(74) *Attorney, Agent, or Firm* — Fish & Richardson P.C.

(57) ABSTRACT

A stand for a portable electronic device includes a device receiving side including a coupling component for engaging with the portable electronic device when the portable electronic device is in a first orientation relative to the device receiving side and when the portable electronic device is in a second orientation relative to the device receiving side. The stand also includes a first support side adjacent to the device receiving side to act as a base when the portable electronic device is in the first orientation, and a second support side adjacent to the first support side to act as a base when the portable electronic device is in the second orientation.

23 Claims, 5 Drawing Sheets

(56) References Cited

OTHER PUBLICATIONS

Daimaou-G.G-B: "New Otas iPod Touch and iPhone Stand with 4 Port USB HUB and LED Light", Jul. 13, 2009, XP55039688, Retrieved from the internet: URL: http://en.akihabaranews.com/23724/legacy-unused/pc/new-otas-ipod-touch-and-iphone-stand-with-4-port-usb-hub-and-led-light; retrieved on Oct. 1, 2012.
Amazon.com:iHomeiB967B Charging Station for E-readers, Kindle, Blackberries, Ipods and Iphones. http://www.amazon.com/iHome-Charging-Station-E-readers-Blackbewrries/dp/B003SVNKOU/ref=pf_sim_e_1; retrieved on Jul. 3, 2012.
Palm USA-HP Touchstone Technology; http://www.hpwebos.com/us/products/accessories/touchstone-technology.html; retrieved on Jul. 3, 2012.
Priya, Ganapati; Palm's Touchstone: Not just a wireless charger, But a whole line of new products? http://www.wired.com/gadgetlab/2009/04/palm-slip-new/; published on Apr. 13, 2009 and retrieved on Jul. 3, 2012.
Examination Report mailed Feb. 7, 2014; in corresponding European patent application No. 12172894.3.
Examination Report mailed Sep. 1, 2014; in corresponding European patent application No. 12172894.3.
Summons to Attend Oral Proceedings Pursuant to Rule 115(1) EPC issued in EP Application No. 12172894.3 on Feb. 11, 2015; 9 pages.

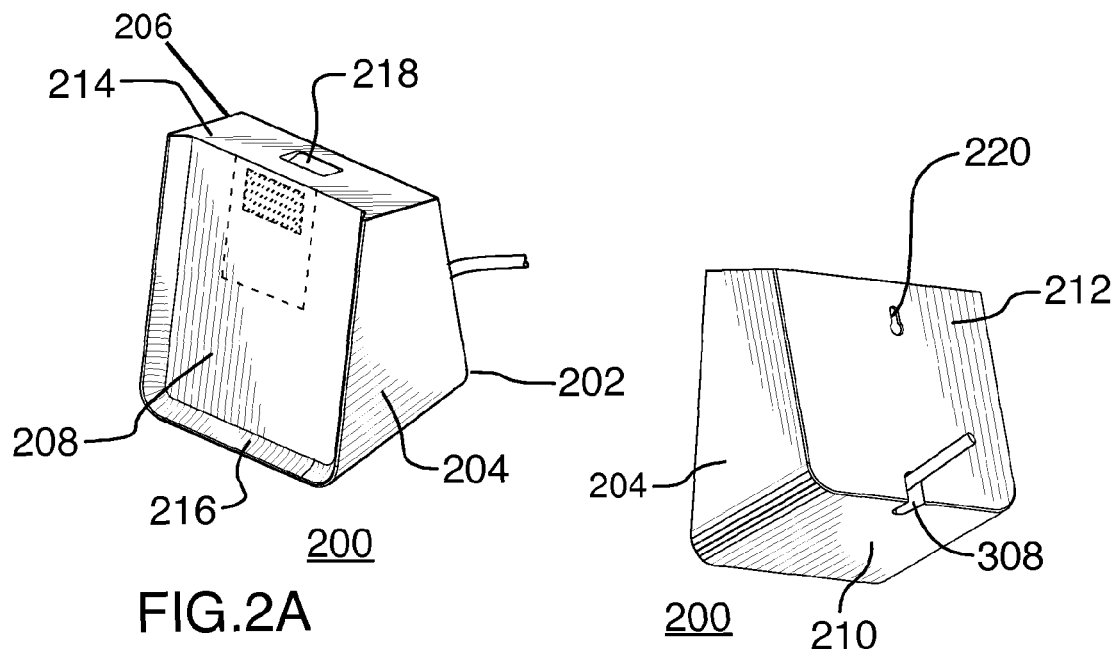
FIG.2A
FIG.2B
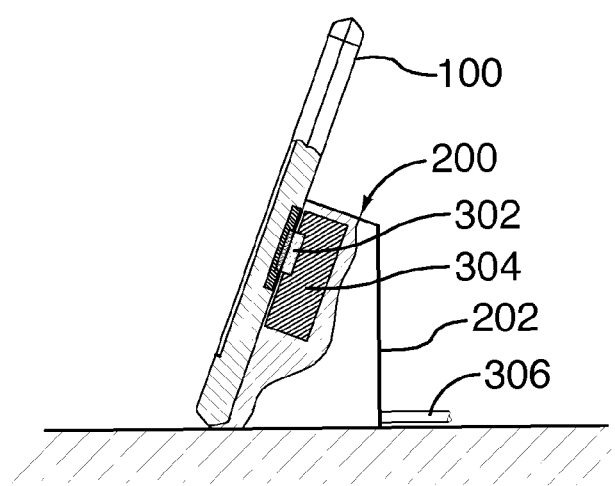
FIG.3
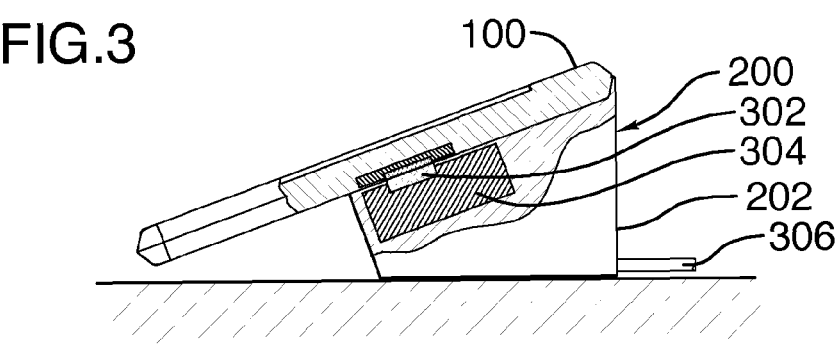
FIG.4

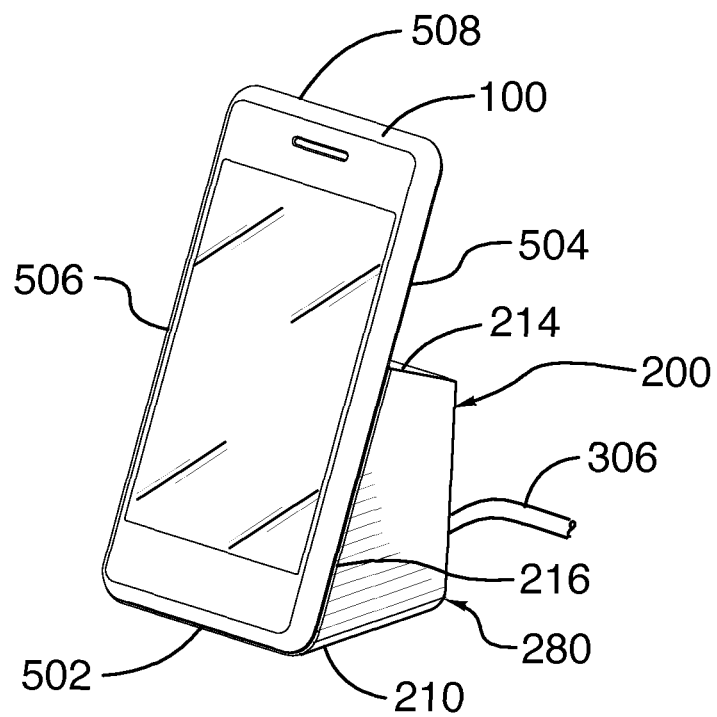
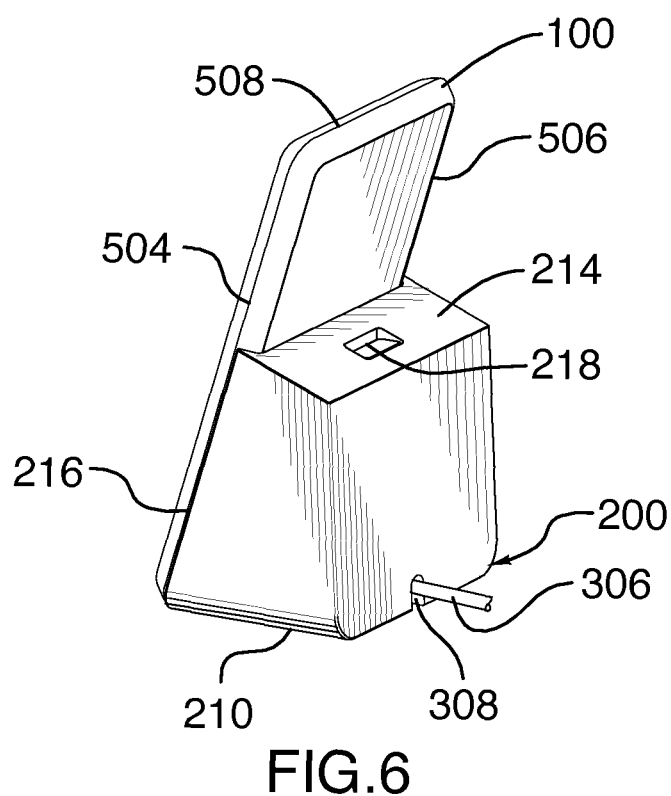

MULTI-ORIENTATION STAND FOR A PORTABLE ELECTRONIC DEVICE

FIELD OF TECHNOLOGY

The present disclosure relates to stands for portable electronic devices that may support the portable electronic device in a plurality of substantially spaced relations to a generally horizontal surface, such as a docking stand for charging a battery of a portable electronic device.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), tablet computers, and laptop computers with wireless 802.11 or Bluetooth capabilities.

Stands, such as docking stations or stands are commonly utilized to provide a convenient receptacle for an electronic device while coupling to a power source for charging a battery of the portable electronic device. Such stands may also provide an interface for data transfer between the portable electronic devices and, for example, a computer.

BRIEF DESCRIPTION OF THE DRAWINGS

Embodiments of the present disclosure will now be described, by way of example only, with reference to the attached figures.

FIG. 2A and FIG. 2B are perspective views of a stand in a first orientation for use with the portable electronic device.

FIG. 3 is a side view of the stand in the first orientation and a portable electronic device in a corresponding first orientation, with a portion cut away.

FIG. 4 is a partial cut away side view of the stand in the second orientation and a portable electronic device is a corresponding second orientation, with a portion cut away.

FIG. 5 is a perspective view of the stand in the first orientation including the portable electronic device in the first orientation.

FIG. 6 is an alternate perspective view of the stand in the first orientation including the portable electronic device in the first orientation.

DETAILED DESCRIPTION

Figure 1:
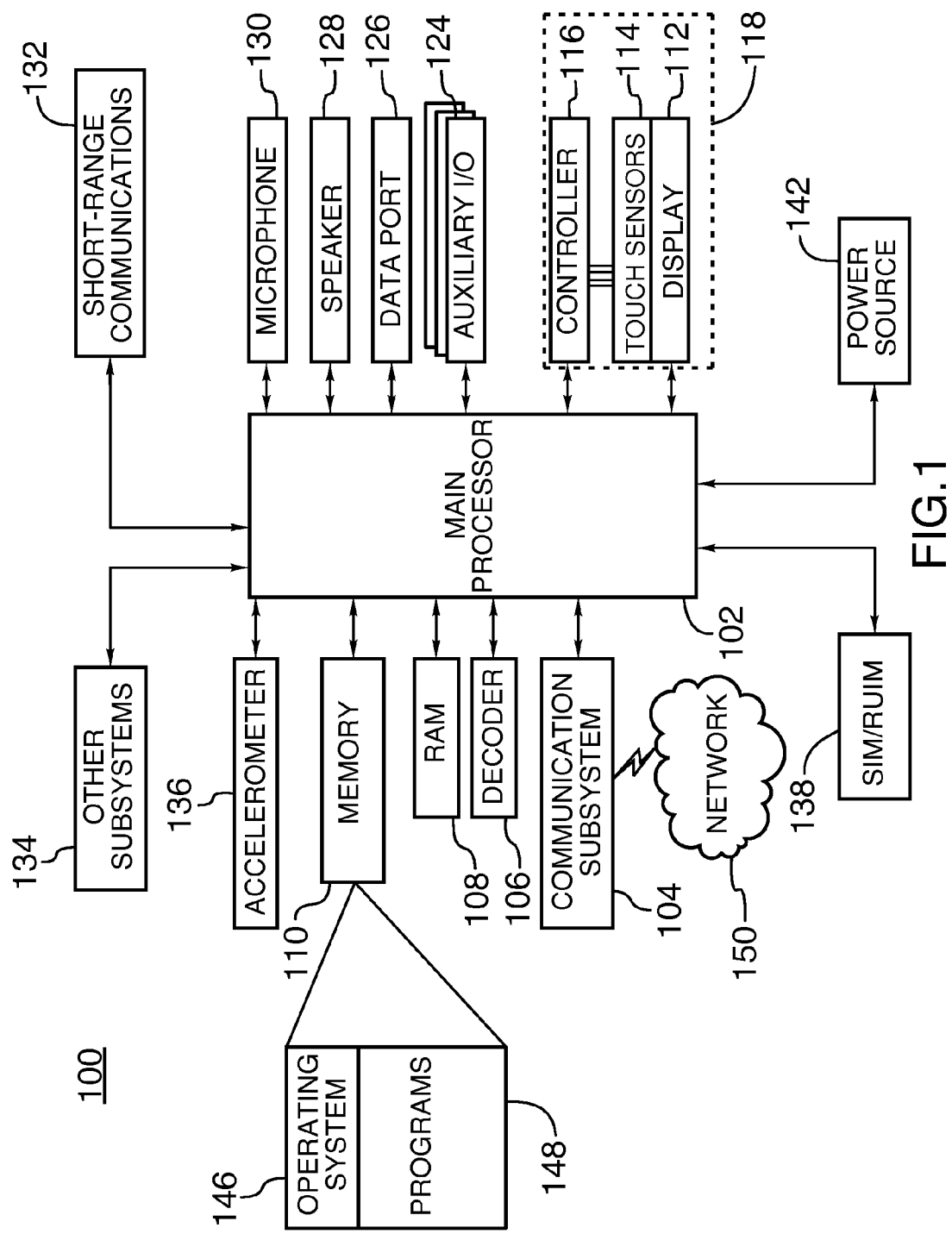
FIG. 1 is a block diagram of an example of a portable electronic device in accordance with the disclosure.

Some portable electronic devices, such as smart telephones and tablet computers, may be handheld for ease of use and portability. That is, handheld devices are sized and shaped to be held or carried in a human hand and may be used while held. Many portable electronic devices include orientation sensing devices, such as an accelerometer to detect an orientation of the device and display information in a corresponding orientation. Portable electronic devices are commonly used in an orientation that is dependent on the application running on the device. Further, individual users may prefer to use a portable electronic device in one orientation for one purpose and in a different orientation for a different purpose. A stand that facilitates movement of the portable electronic device into different orientations is desirable to improve ease of use of the portable electronic device during charging or during data transfer.

The following describes a stand for a portable electronic device includes a device receiving side including a coupling component for engaging with the portable electronic device when the portable electronic device is in a first orientation relative to the device receiving side and when the portable electronic device is in a second orientation relative to the device receiving side. The stand also includes a first support side adjacent to the device receiving side to act as a base when the portable electronic device is in the first orientation, and a second support side adjacent to the first support side to act as a base when the portable electronic device is in the second orientation.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein. Words such as "substantial" or "generally," as used herein, are intended to be descriptive but to avoid strict application or strict mathematical definition. To illustrate: two surfaces that are "substantially parallel" may be strictly parallel or approximately parallel; a shape that is "substantially a parallelogram" may be approximately a parallelogram, although it may not be exactly a parallelogram and although it may have rounded corners, for example; and "generally perpendicularly" includes but is not limited to precisely perpendicularly. The absence of any words that expressly avoid strict application or definition (in the detailed description and in the claims), however, does not necessarily mean that strictness is intended. The stand described herein may be utilized with a variety of portable electronic devices including various components. In some embodiments, for example, the stand may include electrical components or moving parts, and may perform functions in addition to serving as a stand. In other embodiments, however, the stand may do little other than serve as a stand, that is, it may support a portable electronic device in a plurality of substantially spaced relations to a generally horizontal surface such as a table, but have little or no additional functionality.

Examples of electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The electronic device may be a portable electronic device without wireless communication capabilities, such as a handheld electronic game, digital photograph album, digital camera, media player, e-book reader, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries, powers the portable electronic device 100. The portable electronic device may also include charging circuitry (not shown), such as an inductive coil and a power controller, that may enable the power source to be recharged wirelessly or through a physical electrical connection or both. As will be discussed below, some embodiments of a stand may be used to deliver power to or recharge a battery in the portable electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is typically provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an orientation sensor, such as an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be a capacitive touch-sensitive display that includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

Perspective views of a stand 200 in a first orientation for use with the portable electronic device are shown in FIG. 2A and FIG. 2B. The stand 200 includes a generally prismatic body 202 for holding the portable electronic device 100, and electrical components disposed in the body 202 for electrically communicating with the portable electronic device 100. The body 202 may be made of any suitable material, such as, for example, injection molded plastic. Other inorganic or organic materials, or combinations of materials, that may offer qualities such as durability, robustness, sturdiness, heat management, aesthetic attractiveness, reasonable weight and the like, may include various metals, plastics, polymers, rubbers, silicones, wood, glass, ceramics, stone, composites and the like. The body 202 may include ends 204, 206. The ends 204, 206 may be substantially identical to one another in shape (in FIGS. 2A and 2B, the faces of ends 204 and 206 are nearly identical but mirror-reversed). The ends 204 and 206 may be, but need not be, substantially parallel to one another. Four sides, each of which may be substantially planar and substantially a parallelogram, extend between the ends 204, 206. The four sides include a device receiving side 208, a first support side 210, a second support side 212, and a further, or third side 214. The body 202 may be constructed in a unitary construction or as an assembled or joined set or one or more sides or ends. In some variations, the body 202 may be disassembled or collapsed by a user to make the stand 200 even more compact for transport. As discussed below, various sides or ends may act as a base and may abut a surface such as a table. The sides or ends may include an anti-slip texture or anti-slip material, so that the base is less likely to slip or slide on the surface. Resistance to sliding may be especially helpful when the portable electronic device 100 includes a user-activated structure such as a button, key or touch-sensitive display 118.

As illustrated by FIGS. 2A and 2B, the first support side 210 is adjacent to the device receiving side 208 such that the first support side 210 extends from one end of the device receiving side 208 and forms an acute angle (such as approximately 70 degrees) with the device receiving side 208. The third side 214 is adjacent the device receiving side 208 such that the third side 214 extends generally perpendicularly from an opposing end of the device receiving side 208 to the second support side 212. The second support side 212 is adjacent the first support side 210 and the third side 214 and extends between ends of the first support side 210 and the third side 214. The second support side 212 extends generally perpendicularly from the first support side 210 and forms an obtuse angle (such as approximately 110 degrees) with the third side 214.

The device receiving side 208 is sized and shaped to receive the portable electronic device 100. A substantially U-shaped lip 216 extends from the device receiving side 208, at the edges at which the device receiving side 208 meets the first support side 210, the first end 204 and the second end 206. The lip 216 does not extend along the edge at which the device receiving side 208 meets the third side 214. The lip 216 facilitates location of the portable electronic device 100 in the stand 200 and engagement of the portable electronic device 100 with a coupling component of the stand 200 as ends of the portable electronic device 100 abut against the lip 216 when the portable electronic device 100 is placed in the stand 200. The lip 216 is an optional structure, or need not be U-shaped nor exactly as depicted in FIG. 2A. As discussed below, in some variations, there may be different or additional structures that may facilitate location of the portable electronic device 100 in the stand 200 or engagement of the portable electronic device 100 with a coupling component of the stand 200.

Optionally, the second support side 212 may include a mount, that is, a structure or apparatus that may facilitate attachment of the body 202 to another structure, such as a wall or an automobile dash. In the illustration of FIG. 2B, the mount is represented as a keyhole slot 220 to facilitate mounting of the stand 200 to a wall. The concepts are not restricted, however, to any particular kind of mount. In some embodiments, more than one mount may be included, and a mount may be included at a site other than the second support side 212.

Referring to FIG. 3 and FIG. 4, a coupling component 302 optionally may disposed in the body 202, such as on (that is, fastened to or otherwise proximate to) the device receiving side 208, generally centered between the first end 204 and the second end 206, and disposed closer to the third side 214 than the first side 210. The coupling component 302 is utilized to couple to a complementary component of the portable electronic device 100 to provide any suitable physical or mechanical coupling. In the example illustrated, the coupling component 302 is a magnet and is disposed in the body 202 to cooperate with a complementary magnet disposed in the portable electronic device 100 and releasably connect (that is, fasten, but not necessarily permanently or tightly, typically without any need for tools) the portable electronic device 100 with or on the device receiving side 208 of the body 202. Alternatively, the coupling component 302 may be any other suitable coupling, such as a mechanical coupling (e.g., a clasp or friction lining) and may be visible on the device receiving side 208 of the body 202. In some embodiments, the lip 216 may assist in physically or mechanically coupling the portable electronic device 100 to the stand 200, and may function as or may be part of a coupling component.

The body 202 may also include the electrical components 304 at the device receiving side 208 for communicating with the portable electronic device 100. The communication may be inductive, near field communication (NFC), electrically conductive or optical, for example. The communication may enable transmission of data or power. For example, inductive or electrically conductive communication may enable charging of the battery of the portable electronic device 100. In one example, the electrical components 304 include an inductive coil disposed in the body 202 to cooperate with an inductive coil disposed in the portable electronic device 100 for charging the battery of the portable electronic device 100. The electrical components may also include a circuit board in communication with the inductive coil for signal control and routing. Rather than an inductive coil, the electrical components 304 may alternatively include electrical contacts or connectors on the device receiving side 208 or flush with the surface of the device receiving side 208. Electrical contacts may be utilized to charge the battery of the portable electronic device 100 and may be utilized as a data interface to couple the portable electronic device 100 to, for example, a computer or other electronic device.

In the embodiments depicted in the drawings, a cable 306 exits the body 202 from a slot 308 (shown in FIG. 2B) disposed between the first support side 210 and the second support side 212. The slot 308 facilitates exit of the cable 306 from the body 202 when the body 202 is disposed in various orientations on a surface, such as a desk, and further enables the cable 306 to avoid being disposed between any side of the stand 200 acting as a base and the surface the base is resting upon or abutting, thereby enabling more stable base-to-surface contact. The cable 306 may be electrically or optically coupled to the circuit board in the body 202 and may be used to transmit power or data or both. In some embodiments, the cable 306 need not be a single cable.

In the example illustrated in FIG. 2A, the third side 214 may include an optional aperture in which a port 218 is disposed. The port 218 may be, for example, a Universal Serial Bus (USB) port. The USB port 218 may be electrically coupled to the circuit board and may be utilized to couple to a further electronic device, for charging a battery of the further electronic device.

As illustrated by the drawings, the stand 200 may be utilized in several orientations, including a first orientation shown in FIGS. 3, 5 and 6, in which the first support side 210 acts as a base. In a second orientation, shown in FIGS. 4, 7 and FIG. 8, the second support side 212 acts as a base.

In the first orientation of the stand 200, shown in FIG. 5 and FIG. 6, the first support side 210 acts as the base in that the first support side 210 is disposed on and abuts a surface on which the stand 200 is located, such as a table. The third side 214 is disposed at a top of the stand 200 and thus the USB port 218 is available for connection to a USB cable or connector. The cable 306 exits the body 202 from the slot 308. The mount or keyhole slot 220 is shown in FIG. 2 is optional and is not shown again in FIG. 6.

The portable electronic device 100 may be disposed in the stand 200 when the stand 200 is in the first orientation by placing the portable electronic device 100 in a first orientation relative to the stand 200. In this first orientation of the portable electronic device 100 relative to the stand 200, a first end 502 and parts of the two sides 504, 506 of the portable electronic device 100 abut the lip 216. The portable electronic device 100 extends past the stand 200 such that a second end 508 of the portable electronic device 100, opposite the first end 502, is spaced from the stand 200. A back side of the portable electronic device 100 rests against device receiving side 208 and may be physically held or coupled to the body 202 via the coupling component 302. When the cable 306, which may transmit electrical power, is plugged into a power source, such as a wall outlet or a second electronic device, while the portable electronic device 100 is disposed in the stand 200, charging of the battery may occur.

Figure 7:
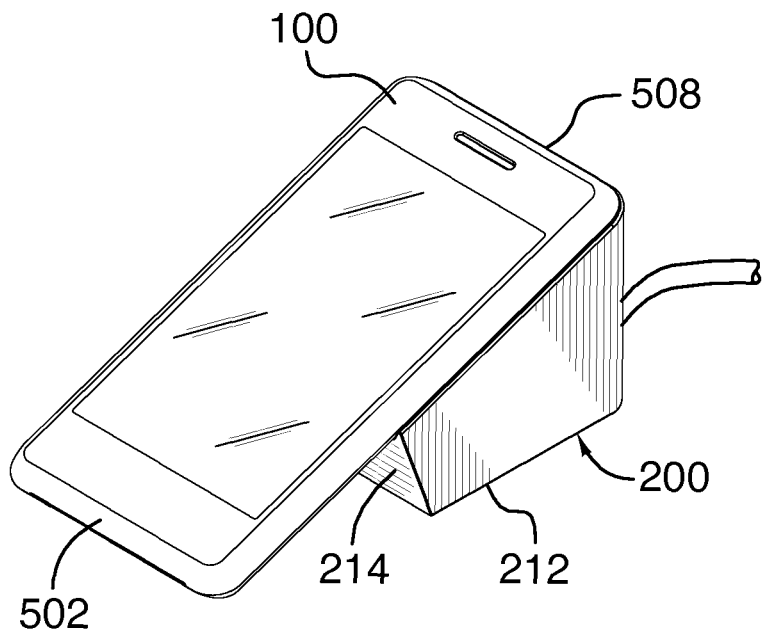
FIG. 7 is a perspective view of the stand in the second orientation including the portable electronic device in the second orientation.
Figure 8:
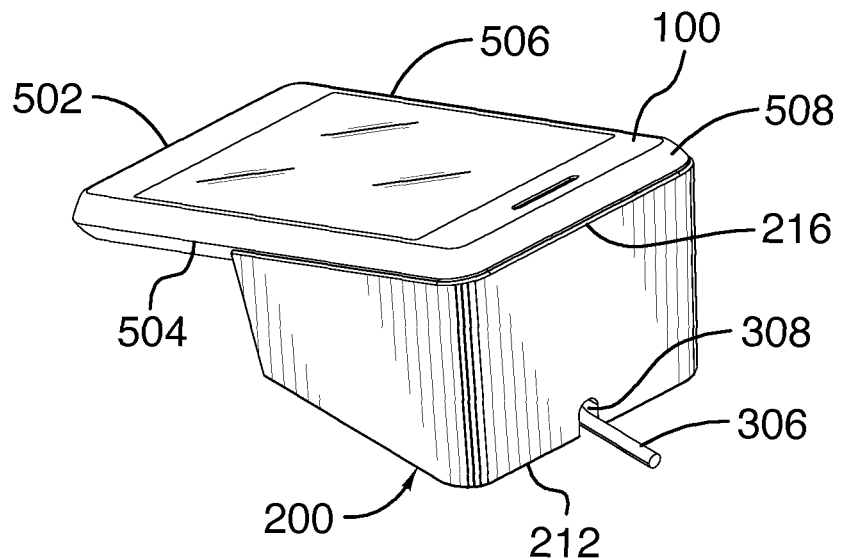
FIG. 8 is an alternate perspective view of the stand in the second orientation including the portable electronic device in the second orientation.

In the second orientation of the stand 200, shown in FIG. 7 and FIG. 8, the second support side 212 acts as the base in that the second support side 212 is disposed on and abuts a surface, such as a table or wall, when wall mounted. The third side 214 is hidden in FIG. 7 by the portable electronic device 100. The cable 306 exits the body from the slot 308.

The portable electronic device 100 may be disposed in the stand 200 when the stand 200 is in the second orientation by placing the portable electronic device 100 in a second orientation relative to the stand 200. In the second orientation of the portable electronic device 100 relative to the stand 200, the second end 508 of the portable electronic device 100, which is opposite to the first end 502, and parts of the two sides 504, 506 of the portable electronic device 100 abut the lip 216. The portable electronic device 100 extends past the stand 200 such that the first end 502 of the portable electronic device 100 is spaced from the stand 200. Thus, the portable electronic 200 is rotated 180 degrees relative to the stand 200 by comparison to the orientation of the electronic device 100 relative to the stand 200 as illustrated in FIG. 5 and FIG. 6. The back side of the portable electronic device 100 rests against device receiving side 208 and is coupled to the body 202 via the coupling component 302 (shown in FIG. 4). When the cable 306 is connected to a power source while the portable electronic device 100 is disposed in the stand 200, charging of the battery may occur. Thus, the electrical components 304 are operable to charge the battery of the portable electronic device 100 in both orientations of the portable electronic device 100 relative to the stand 200.

When the stand 200 is in the second orientation, the portable electronic device 100 is at an angle relative to the surface on which the stand 200 rests and the angle is less than the angle between the portable electronic device 100 and the rest surface when the stand is in the first orientation. Thus, the portable electronic device 100 is closer to lying flat or horizontal when the stand 200 is in the second orientation than when the stand 200 is in the first orientation. The two different orientations may be utilized for different functions or applications running on the portable electronic device 100. For example, the stand 200 may be placed in the first orientation and the portable electronic device 100 placed in the stand 200 to view lists, to begin a video call, and to view pictures, to name a few examples. The stand 200 may be placed in the second orientation and the portable electronic device 100 may be placed in the stand 200 to type on the portable electronic device 100, for hands-free calling, and to select features on the touch-sensitive display 118, to name a few examples.

Figure 9:
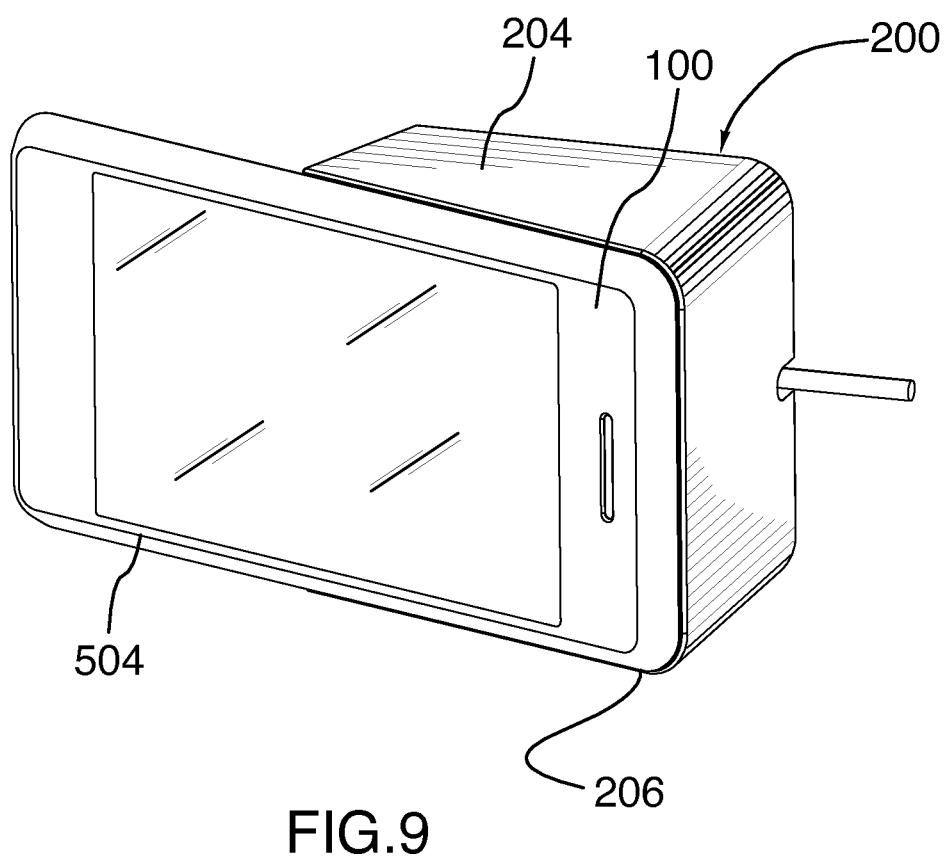
FIG. 9 is a perspective view of the stand in a further orientation including the portable electronic device in the second orientation.

The ends 204, 206 may also act as bases in further orientations of the stand, as shown in FIG. 9. In the example of FIG. 9, the side 206 acts as the base and abuts a surface, such as a table.

The portable electronic device 100 may be disposed in the stand 200 when the stand 200 is in the further orientation by placing the portable electronic device 100 in the second orientation relative to the stand 200. The portable electronic device 100 is in a landscape orientation in this orientation, such that the side 504 of the portable electronic device 100 extends generally parallel to the table. In the example of the stand 200 described herein, the portable electronic device 100 extends generally perpendicularly from the surface on which the stand 200 rests. The orientation of the stand 200 and the orientation of the portable electronic device 100 illustrated in FIG. 9 may be utilized, for example, for displaying a clock or for use as an alarm clock, or for showing photographs on a display 112. In the illustration of FIG. 9, the ends 204, 206 are substantially parallel to one another, causing the portable electronic device 100 to be oriented generally perpendicular to the surface. As previously observed, however, the ends 204, 206 need not be substantially parallel to one another. When the ends 204 and 206 are out of parallel, the portable electronic device 100 to be oriented at another angle relative to the surface. Further, using one end 204 as the base may cause portable electronic device 100 to be oriented at a first angle, and using the other end 206 as the base may cause portable electronic device 100 to be oriented at a second and different angle. In such embodiments, the stand 200 need not be generally prismatic, that is, no two sides need be substantially parallel to one another.

The stand facilitates use of the portable electronic device in multiple orientations. The portable electronic device may be rested on or coupled to the stand in each of the orientations. The portable electronic device 118 may be configured to automatically enter an application or execute a function based on the orientation of the portable electronic device 100 when placed in the base 200, i.e., based on the orientation of the base 200. Thus, the portable electronic device 100 may enter a first application when the base 200 is in the first orientation, and may enter a second application when the base 200 is in the second orientation. The portable electronic device 118 may determine the orientation based on signals from the accelerometer 136 or based on a signal received when coupled to the base 200.

The embodiments described above may also be described in more general terms. For example the device receiving side 208 may be referred to as a fourth side, and the ends 204 and 206 may be referred to as fifths and sixth sides (or support sides). Further, various components may be described in terms of means for performing a specified function.

One or more embodiments of the concepts may realize one or more advantages, some of which have been mentioned already. Some embodiments support use of a portable electronic device in two, three, or more orientations. A user may change from one orientation to another easily, in some cases, without disengaging the portable electronic device from the stand. Some embodiments omit or have very few moving parts, which may improve durability and robustness and reduce the risk of breakage or wearing out. Further, many embodiments of the concept may be fairly compact, lightweight, and easy to transport.

The described embodiments are to be considered in all respects only as illustrative and not restrictive. The scope of the claims should not be limited by the preferred embodiments set forth in the examples, but should be given the broadest interpretation consistent with the description as a whole. Many variations may be within the scope of the claims, such as stands that do not include exactly six sides, embodiments that include no moving parts and embodiments that include no electrical components.

What is claimed is:

1. A stand for a portable electronic device, the stand comprising:
    a device receiving side including a coupling component for engaging with the portable electronic device when the portable electronic device is in a first orientation relative to the device receiving side and when the portable electronic device is in a second orientation relative to the device receiving side;
    a first support side adjacent to the device receiving side to act as a base, such that the first support side abuts a surface on which the stand is rested, when the portable electronic device is in the first orientation; and
    a second support side different from the first support side and adjacent to the first support side to act as a base, such that the second support side abuts the surface on which the stand is rested, when the portable electronic device is in the second orientation.

2. The stand according to claim 1, wherein the first support side and the device receiving side form an acute angle therebetween.

3. The stand according to claim 1, wherein the second support side extends perpendicular from the first support side.

4. The stand according to claim 1, wherein the coupling component comprises a magnet.

5. The stand according to claim 1, further comprising electrical components for electrically communicating with the portable electronic device to enable charging of a battery of the portable electronic device.

6. The stand according to claim 5, wherein the electrical components comprise an inductive coil for induction charging.

7. The stand according to claim 5, further comprising a data interface to facilitate data transfer to and from the portable electronic device.

8. The stand according to claim 1, further comprising a further side extending between the device receiving side and the second support side.

9. The stand according to claim 8, further comprising an electrical port disposed in an aperture in the further side.

10. The stand according to claim 9, wherein the electrical port comprises a USB port to enable charging of a battery of a further electronic device.

11. A stand for a portable electronic device, the stand comprising:
   a device receiving side including a coupling component for engaging with the portable electronic device when the portable electronic device is in a first orientation relative to the device receiving side and when the portable electronic device is in a second orientation relative to the device receiving side;
   a first support side adjacent to the device receiving side to act as a base when the portable electronic device is in the first orientation;
   a second support side adjacent to the first support side to act as a base when the portable electronic device is in the second orientation; and
   a lip extending along at least one edge of the device receiving side for abutting with an end of the portable electronic device to facilitate engagement of the portable electronic device with the coupling component on the device receiving side.

12. The stand according to claim 11, wherein the coupling component comprises a magnet.

13. The stand according to claim 11, comprising electrical components for electrically communicating with the portable electronic device to enable charging of a battery of the electronic device, wherein the electrical components comprise a cable extending from a slot disposed between the first support side and the second support side.

14. The stand according to claim 13, wherein the electrical components comprise an inductive coil for induction charging.

15. The stand according to claim 11, further comprising a data interface to facilitate data transfer to and from the portable electronic device.

16. The stand according to claim 11, further comprising a further side extending between the device receiving side and the second support side.

17. The stand according to claim 16, further comprising an electrical port disposed in an aperture in the further side to enable charging of a battery of a further electronic device.

18. A stand for a portable electronic device, the stand comprising:
   a device receiving side including a coupling component for engaging with the portable electronic device when the portable electronic device is in a first orientation relative to the device receiving side and when the portable electronic device is in a second orientation relative to the device receiving side;
   a first support side adjacent to the device receiving side to act as a base when the portable electronic device is in the first orientation;
   a second support side adjacent to the first support side to act as a base when the portable electronic device is in the second orientation; and
   electrical components for electrically communicating with the portable electronic device to enable charging of a battery of the electronic device, wherein the electrical components comprise a cable extending from a slot disposed between the first support side and the second support side.

19. The stand according to claim 18, wherein the electrical components comprise an inductive coil for induction charging.

20. The stand according to claim 18, further comprising a data interface to facilitate data transfer to and from the portable electronic.

21. The stand according to claim 18, further comprising a further side extending between the device receiving side and the second support side.

22. The stand according to claim 21, further comprising an electrical port disposed in an aperture in the further side.

23. The stand according to claim 22, wherein the electrical port comprises a USB port to enable charging of a battery of a further electronic device.

\* \* \* \* \*